(12) United States Patent
Wang (10) Patent No.: US 8,094,722 B2
(45) Date of Patent: Jan. 10, 2012

(54) INTRA PREDICTION METHOD FOR LUMA BLOCK OF VIDEO

(75) Inventor: Wen-Shan Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 839 days.

(21) Appl. No.: 12/177,892

(22) Filed: Jul. 23, 2008

(65) Prior Publication Data

US 2009/0195690 A1 Aug. 6, 2009

(30) Foreign Application Priority Data

Feb. 4, 2008 (TW) .............................. 97104256 A (51) Int. Cl.
*H03M 13/37* (2006.01)
(52) U.S. Cl. .................................................. 375/240.13
(58) Field of Classification Search .................. None
See application file for complete search history.

(56) References Cited

U.S. PATENT DOCUMENTS

| 2005/0013376 | A1 | 1/2005 | Dattani et al. | |
|---|---|---|---|---|
| 2006/0227863 | A1 | 10/2006 | Adams | |
| 2009/0110067 | A1* | 4/2009 | Sekiguchi et al. | 375/240.12 |
| 2011/0075735 | A1* | 3/2011 | Drezner | 375/240.13 |

FOREIGN PATENT DOCUMENTS

TW I265739 11/2006

OTHER PUBLICATIONS

"Office Action of Taiwan Counterpart Application", issued on Jul. 28, 2011, p. 1-p. 9.
Article titled "Analysis, Fast Algorithm, and VLAI Architecture Design for H.264/AVC Intra Frame Coder" authored by Huang et al., IEEE Transactions on Circuits and Systems Video Technology, vol. 15, No. 3 Mar. 2005, pp. 378-401.

* cited by examiner

*Primary Examiner* — Chirag Shah
*Assistant Examiner* — Amar Persaud
(74) *Attorney, Agent, or Firm* — Jianq Chyun IP Office (57) ABSTRACT

An intra prediction method for a luma block of a video is provided. The present invention provides a solution for unifying the intra prediction of the luma block of the video, which simplifies a plurality of prediction equations defined by video standard. The predication values of common terms in the prediction equations are calculated in advance and directly selected for predicting the luma block of the video. Accordingly, only a few function parameters or register settings are needed to be modified, and then a plurality of prediction modes may use the same software function or hardware circuit to obtain the prediction values.

16 Claims, 11 Drawing Sheets

4x4 Block

| I4MB Mode | L | K | J | I | M | A | B | C | D | E | F | G | H | Round | Shift | Pixel_position (y,x) |
|---|---|---|---|---|---|---|---|---|---|---|---|---|---|---|---|---|
| Vertical |  |  |  |  |  | 1 |  |  |  |  |  |  |  | 0 | >>0 | (0,0) (1,0) (2,0) (3,0) |
|  |  |  |  |  |  |  | 1 |  |  |  |  |  |  | 0 | >>0 | (0,1) (1,1) (2,1) (3,1) |
|  |  |  |  |  |  |  |  | 1 |  |  |  |  |  | 0 | >>0 | (0,2) (1,2) (2,2) (3,2) |
|  |  |  |  |  |  |  |  |  | 1 |  |  |  |  | 0 | >>0 | (0,3) (1,3) (2,3) (3,3) |
| Horizontal |  |  |  | 1 |  |  |  |  |  |  |  |  |  | 0 | >>0 | (0,0) (1,0) (2,0) (3,0) |
|  |  |  | 1 |  |  |  |  |  |  |  |  |  |  | 0 | >>0 | (1,0) (1,1) (1,2) (1,3) |
|  |  | 1 |  |  |  |  |  |  |  |  |  |  |  | 0 | >>0 | (2,0) (2,1) (2,2) (2,3) |
|  | 1 |  |  |  |  |  |  |  |  |  |  |  |  | 0 | >>0 | (3,0) (3,1) (3,2) (3,3) |
| DC | 1 | 1 | 1 | 1 |  | 1 | 1 | 1 | 1 |  |  |  |  | 4 | >>3 | ALL |
| Diagonal down-left |  |  |  |  |  | 1 | 2 | 1 |  |  |  |  |  | 2 | >>2 | (0,0) |
|  |  |  |  |  |  |  | 1 | 2 | 1 |  |  |  |  | 2 | >>2 | (0,1) (1,0) |
|  |  |  |  |  |  |  |  | 1 | 2 | 1 |  |  |  | 2 | >>2 | (0,2) (1,1) (2,0) |
|  |  |  |  |  |  |  |  |  | 1 | 2 | 1 |  |  | 2 | >>2 | (0,3) (1,2) (2,1) (3,0) |
|  |  |  |  |  |  |  |  |  |  | 1 | 2 | 1 |  | 2 | >>2 | (1,3) (2,2) (3,1) |
|  |  |  |  |  |  |  |  |  |  |  | 1 | 2 | 1 | 2 | >>2 | (2,3) (3,2) |
|  |  |  |  |  |  |  |  |  |  |  |  | 1 | 3 | 2 | >>2 | (3,3) |
| Diagonal down-right | 1 | 2 | 1 |  |  |  |  |  |  |  |  |  |  | 2 | >>2 | (3,0) |
|  |  | 1 | 2 | 1 |  |  |  |  |  |  |  |  |  | 2 | >>2 | (2,0) (3,1) |
|  |  |  | 1 | 2 | 1 |  |  |  |  |  |  |  |  | 2 | >>2 | (1,0) (2,1) (3,2) |
|  |  |  |  | 1 | 2 | 1 |  |  |  |  |  |  |  | 2 | >>2 | (0,0) (1,1) (2,2) (3,3) |
|  |  |  |  |  | 1 | 2 | 1 |  |  |  |  |  |  | 2 | >>2 | (0,1) (1,2) (2,3) |
|  |  |  |  |  |  | 1 | 2 | 1 |  |  |  |  |  | 2 | >>2 | (0,2) (1,3) |
|  |  |  |  |  |  |  | 1 | 2 | 1 |  |  |  |  | 2 | >>2 | (0,3) |

| M | A | B | C | D | E | F | G | H |
|---|---|---|---|---|---|---|---|---|
| I | f(A,B,C) | f(B,C,D) | f(C,D,E) | f(D,E,F) | | | | |
| J | f(B,C,D) | f(C,D,E) | f(D,E,F) | f(E,F,G) | | | | |
| K | f(C,D,E) | f(D,E,F) | f(E,F,G) | f(F,G,H) | | | | |
| L | f(D,E,F) | f(E,F,G) | f(F,G,H) | f(G,H,H) | | | | |

FIG. 4

| M | A | B | C | D | E | F | G | H |
|---|---|---|---|---|---|---|---|---|
| I | f(I,M,A) | f(M,A,B) | f(A,B,C) | f(B,C,D) | | | | |
| J | f(J,I,M) | f(I,M,A) | f(M,A,B) | f(A,B,C) | | | | |
| K | f(K,J,I) | f(J,I,M) | f(I,M,A) | f(M,A,B) | | | | |
| L | f(L,K,J) | f(K,J,I) | f(J,I,M) | f(I,M,A) | | | | |

FIG. 5

| M | A | B | C | D | E | F | G | H |
|---|---|---|---|---|---|---|---|---|
| I | f(M,A) | f(A,B) | f(B,C) | f(C,D) | | | | |
| J | f(I,M,A) | f(M,A,B) | f(A,B,C) | f(B,C,D) | | | | |
| K | f(J,I,M) | f(M,A) | f(A,B) | f(B,C) | | | | |
| L | f(K,J,I) | f(I,M,A) | f(M,A,B) | f(A,B,C) | | | | |

FIG. 6

| M | A | B | C | D | E | F | G | H |
|---|---|---|---|---|---|---|---|---|
| I | f(I,M) | f(I,M,A) | f(M,A,B) | f(A,B,C) | | | | |
| J | f(J,I) | f(J,I,M) | f(I,M) | f(I,M,A) | | | | |
| K | f(K,J) | f(K,J,I) | f(J,I) | f(J,I,M) | | | | |
| L | f(L,K) | f(L,K,J) | f(K,J) | f(K,J,I) | | | | |

FIG. 7

| M | A | B | C | D | E | F | G | H |
|---|---|---|---|---|---|---|---|---|
| I | f(A,B) | f(B,C) | f(C,D) | f(D,E) | | | | |
| J | f(A,B,C) | f(B,C,D) | f(C,D,E) | f(D,E,F) | | | | |
| K | f(B,C) | f(C,D) | f(D,E) | f(E,F) | | | | |
| L | f(B,C,D) | f(C,D,E) | f(D,E,F) | f(E,F,G) | | | | |

FIG. 8

| M | A | B | C | D | E | F | G | H |
|---|---|---|---|---|---|---|---|---|
| I | f(J,I) | f(K,J,I) | f(K,J) | f(L,K,J) | | | | |
| J | f(K,J) | f(L,K,J) | f(L,K) | f(L,L,K) | | | | |
| K | f(L,K) | f(L,L,K) | f(L,L) | f(L,L,L) | | | | |
| L | f(L,L) | f(L,L,L) | f(L,L) | f(L,L,L) | | | | |

```
CHAR In[16]={H, H, G, F, E, D, C, B, A, M, I, J, K, L, L, DC};
CHAR Temp[29], n, m;
SHORT T1, T2;

m=0, n=0;
T1=In[n++]+In[n]+1;            //get g(H, H)
for(; n<14; ){
    T2=In[n++]+In[n]+1;        //get g(H, G),g(G, F),g(F, E)...g(L, L) in sequence.
    Temp[m++]=(T1+T2)>>2;      //get f(H, H, G),f(H, G, F),f(G, F, E)...f(K, L, L) in sequence.
    Temp[m++]=T2>>1            //get f(H, G),f(G, F),f(F, E)...f(LL) in sequence.
    T1=T2;                     //Save g(H, G),g(G, F),g(F, E)...g(L, L) in sequence.
}
    Temp[m++]=Temp[m++]=Temp[m]=In[n];//Temp[26]=Temp[27]=Temp[28]=L
```

| i | ln[i] | Prediction mode 0 | | | | Prediction mode 1 | | | | Prediction mode 2 | | | |
|---|---|---|---|---|---|---|---|---|---|---|---|---|---|
| 0 | H | | | | | | | | | | | | |
| 1 | H | | | | | | | | | | | | |
| 2 | G | | | | | | | | | | | | |
| 3 | F | | | | | | | | | | | | |
| 4 | E | | | | | | | | | | | | |
| 5 | D | 3 | 7 | 11 | 15 | | | | | | | | |
| 6 | C | 2 | 6 | 10 | 14 | | | | | | | | |
| 7 | B | 1 | 5 | 9 | 13 | | | | | | | | |
| 8 | A | 0 | 4 | 8 | 12 | | | | | | | | |
| 9 | M | | | | | | | | | | | | |
| 10 | I | | | | | 0 | 1 | 2 | 3 | | | | |
| 11 | J | | | | | 4 | 5 | 6 | 7 | | | | |
| 12 | K | | | | | 8 | 9 | 10 | 11 | | | | |
| 13 | L | | | | | 12 | 13 | 14 | 15 | | | | |
| 14 | L | | | | | | | | | | | | |
| 15 | DC | | | | | | | | | 0 | 1 | 2 | 3 |
| | | | | | | | | | | 4 | 5 | 6 | 7 |
| | | | | | | | | | | 8 | 9 | 10 | 11 |
| | | | | | | | | | | 12 | 13 | 14 | 15 |

INTRA PREDICTION METHOD FOR LUMA BLOCK OF VIDEO

CROSS-REFERENCE TO RELATED APPLICATION

This application claims the priority benefit of Taiwan application serial no. 97104256, filed on Feb. 4, 2008. The entirety of the above-mentioned patent application is hereby incorporated by reference herein and made a part of this specification.

BACKGROUND OF THE INVENTION

1. Field of the Invention

The present invention generally relates to a video image processing method, in particular, to an intra prediction method for a luma block of a video.

2. Description of Related Art

H.264 is a new generation of video compression standard drafted by the Joint Video Team of Video Coding Expert Group (VCEG) and Moving Pictures Experts Group (MPEG). This technique is referred to as advanced video coding (AVC) or together H.264/AVC after being integrated with MPEG-4 Part 10 (ISO/IEC 14496-10). Relative researches reveal that, compared with MPEG-2 and MPEG-4, H.264/AVC significantly improves the compression rate and the video quality, and is thus widely used for video conference, video broadcast, video streaming service, and other video applications.

H.264 employs pixels rebuilt by intra frame coding and inter frame coding to predict coding blocks, thereby achieving better spatial and temporal prediction than previous standards, such as H.263+. When performing pixel prediction with the intra prediction technique, in order to improve the coding efficiency, H.264 predicts through the relativity between an image block and its adjacent blocks in the spatial domain, and only records the adopted prediction modes and the actual errors during data storage. As the values of the errors are smaller than the original pixel values, and the data volume after coding is also reduced, the bit rate of coding can thus be effectively reduced.

Figure 1:
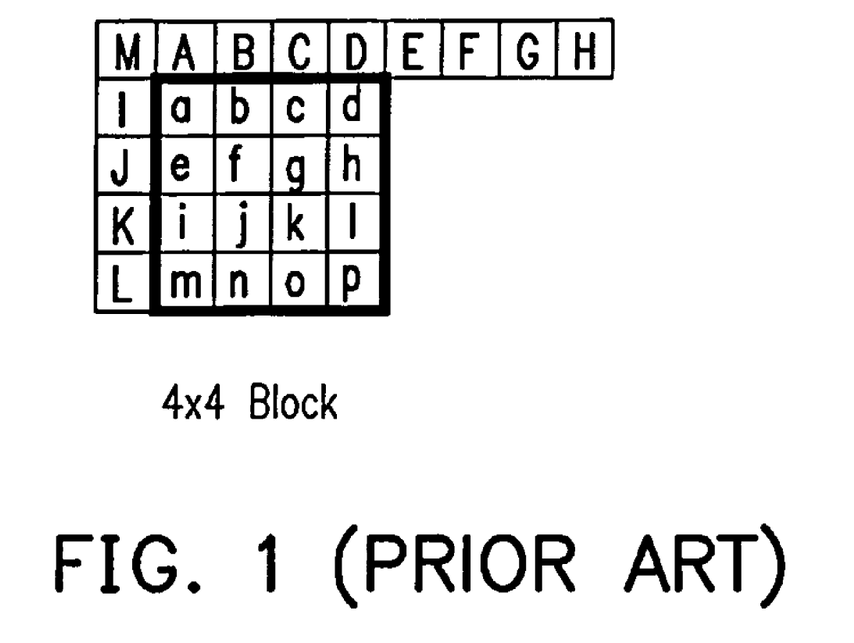
FIG. 1 is a conventional configuration diagram of a 4*4 block of H.264.

The aforementioned adjacent blocks generally refer to blocks on the left, upper left, upper right of, and above the current coding block. The pixels in the adjacent blocks have been coded and reconstructed, so the recorded information can be reused. Taking the prediction of a 4*4 block for example, FIG. 1 is a conventional configuration diagram of a 4*4 block of H.264, in which a-p represent pixels of the luma block, and the rest A-M are neighbor pixels. In addition, A-H represent neighbor pixels in the above and upper right blocks of the luma block, I-L represent neighbor pixels in the left block, and M represents the neighbor pixel in the upper left block. The prediction mode of H.264 is to perform prediction through pixel values of the neighbor pixels.

Figure 2:
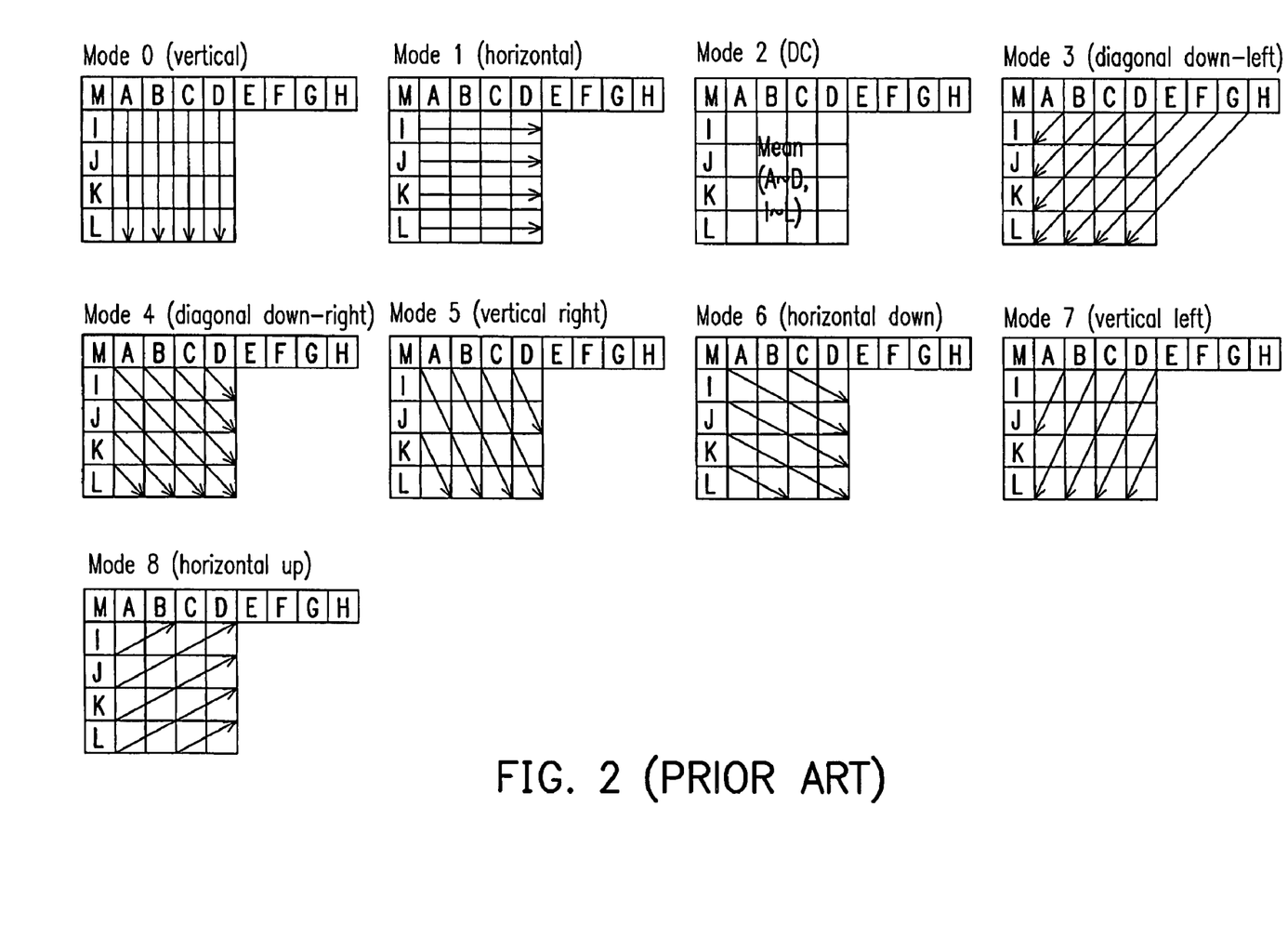
FIG. 2 is a schematic view of nine prediction modes included in conventional 4*4 luma prediction mode of H.264.

According to the image complexity, the intra prediction technique can be classified into 4*4 luma prediction mode, 16*16 luma prediction mode, and 8*8 chroma prediction mode. The 4*4 luma prediction mode further includes nine different prediction modes based on the prediction direction. For example, FIG. 2 is a schematic view of nine prediction modes included in the 4*4 luma prediction mode of H.264 specifications. Liang-Gee Chen further sets forth equation lists of the nine prediction modes (as shown in FIG. 3) in "*Analysis, fast algorithm, and VLSI architecture design for H.264/AVC intra frame coder*" issued in the journal of *IEEE transactions on circuits and systems for video technology*.

Figure 3:
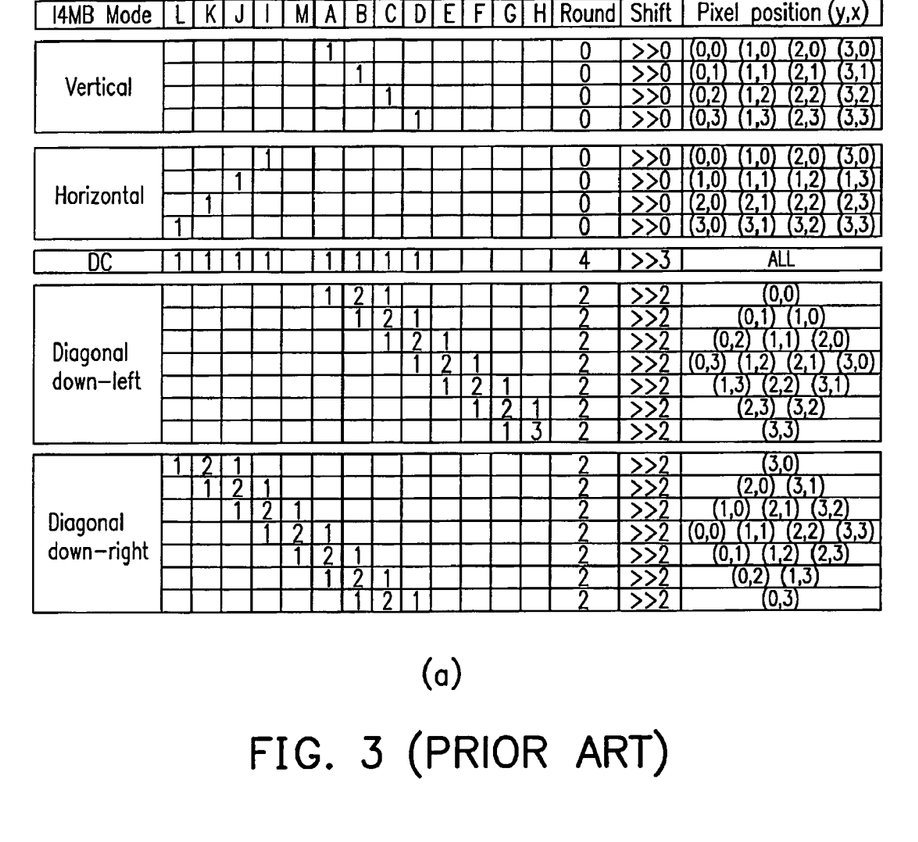
FIGS. 3(a) and 3(b) are equation lists of the nine prediction modes included in the 4*4 luma prediction mode of H.264 according to the conventional art.

Referring to FIGS. 2 and 3, the prediction modes include a DC mode and the other modes in eight directions, and the equations can be concluded according to positions of the pixels to be predicted as follows:

$$\text{Prediction value} = \left\{ \left[ \sum_i \begin{array}{c} (\text{coefficient})_i \times \\ (\text{edge pixel value})_i \end{array} \right] + (\text{Round}) \right\} / 2^{shift}.$$

in which ieedge pixels L, K, J, I, M, A, B, C, D, E, F, G, H. For example if Mode 0 (i.e., a vertical mode) is selected, the prediction value of the pixel (y, x) at column x, row y can be calculated by the following equations:

Pixel (0,0), (1,0), (2,0), (3,0): neighbor pixel value A;
Pixel (0,1), (1,1), (2,1), (3,1): neighbor pixel value B;
Pixel (0,2), (1,2), (2,2), (3,2): neighbor pixel value C;
Pixel (0,3), (1,3), (2,3), (3,3): neighbor pixel value D;

Further, if Mode 3 (i.e., a diagonal down-left mode) is selected, the pixel prediction value can be calculated by the following equations:

Pixel (0,0): neighbor pixel value (A+2B+C+2) shifted rightwards for 2 bits;
Pixel (0,1), (1,0): neighbor pixel value (B+2C+D+2) shifted rightwards for 2 bits;
Pixel (0,2), (1,1), (2,0): neighbor pixel value (C+2D+E+2) shifted rightwards for 2 bits;
Pixel (0,3), (1,2), (2,1), (3,0): neighbor pixel value (D+2E+F+2) shifted rightwards for 2 bits;
Pixel (1,3), (2,2), (3,1): neighbor pixel value (E+2F+G+2) shifted rightwards for 2 bits;
Pixel (2,3), (3,2): neighbor pixel value (F+2G+H+2) shifted rightwards for 2 bits;
Pixel (3,3): neighbor pixel value (G+3H+2) shifted rightwards for 2 bits.

The 4*4 luma prediction mode first employs the above nine prediction modes to search for a predictor with a 4*4 luma block as a unit, then subtracts the predictor from the 4*4 luma block to obtain a residual image, and afterward converts the residual image by the adopted prediction mode to get an image code for the 4*4 sub-block.

However, the above coding manner is required to respectively calculate the prediction values in the nine prediction modes, and then to select the most appropriate prediction mode for coding.

SUMMARY OF THE INVENTION

Accordingly, the present exam ply invention is directed to an intra prediction method for a luma block of a video, in which common items in the prediction equations are found out and calculated, so as to avoid repeating the same operation and thus improving the execution efficiency of the intra prediction.

An intra prediction method for a luma block of a video is provided. The method is applicable to calculate prediction values of pixels in a luma block of a video image, so as to select an optimal prediction mode to encode the luma block of the video image. The method includes the following steps. First, a sum of pixel values of every two adjacent neighbor pixels X, Y in a plurality of neighbor pixels of the luma block plus 1 is calculated, so as to get a first-type intermediate value g(X, Y)=X+Y+1, and then the intermediate value g(X, Y) is shifted rightwards for 1 bit to get a first-type prediction value f(X,Y) corresponding to the adjacent neighbor pixels X,Y, in which X, Y are integers. Next, a sum of the first-type intermediate value g(X, Y) corresponding to the first two adjacent neighbor pixels X, Y and the first-type intermediate value g(Y, Z) corresponding to the last two adjacent neighbor pixels Y, Z of every three neighbor pixels, X, Y, and Z, in the plurality of neighbor pixels is calculated, so as to get a second-type intermediate value g(X, Y, Z)=g(X, Y)+g(Y, Z), and then the second-type intermediate value g(X, Y, Z) is shifted rightwards for 2 bits to get a second-type prediction value f(X, Y, Z) corresponding to the adjacent neighbor pixels X, Y, Z, in which X, Y, Z are integers. After that, the neighbor pixels included in prediction equations of the prediction modes are compared, so as to find out the corresponding prediction values of the pixels in the luma block under the prediction modes. In addition, when the prediction equation includes the adjacent neighbor pixels X, Y, the first-type prediction value f(X, Y) corresponding to the adjacent neighbor pixels X, Y is used as the prediction value of the pixel; and when the prediction equation includes the adjacent neighbor pixels X, Y, Z, the second-type prediction value f(X, Y, Z) corresponding to the adjacent neighbor pixels X, Y, Z is used as the prediction value of the pixel.

In order to make the aforementioned and other objectives, features, and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

It is found by analysis that the equations of the prediction modes for video coding have many similar or overlapped parts. Therefore, as long as the common points of the equations are found out, the equations can be simplified and the calculation results are shared to reduce the amount of operation required by the intra prediction, so as to achieve fast coding. The present invention is an intra prediction method for a luma block of a video developed based on the above concept. In order to make the content of the present invention clearer, the following embodiments are illustrated as examples that can be truly implemented by the present invention.

First, it should be emphasized that, among the nine prediction modes (hereinafter, represented by prediction modes 0-8) of vertical prediction mode, horizontal prediction mode, DC prediction mode, diagonal down-left prediction mode, diagonal down-right prediction mode, vertical right prediction mode, horizontal down prediction mode, vertical left prediction mode, and horizontal up prediction mode, the prediction mode 0 and the prediction mode 1 are merely required to apply the pixel value of the neighbor pixel without performing operations, while the prediction mode 2 is merely required to calculate an average value of the neighbor pixels, such that it is unnecessary to simplify the prediction equations of these prediction modes, and the methods of the following embodiments are mainly used to simplify the operation of the prediction modes 3-8.

Figure 4:
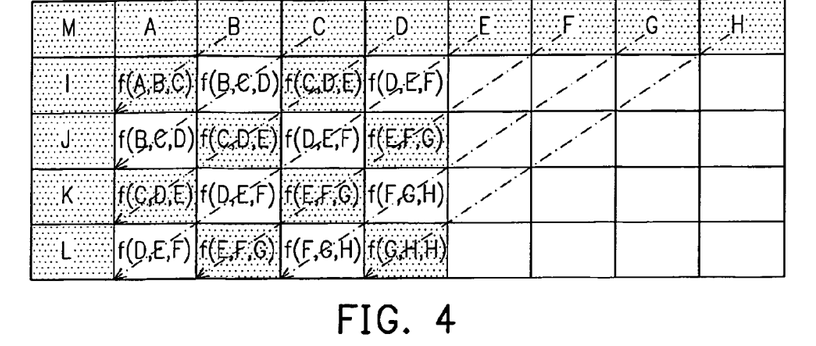
FIG. 4 is a schematic view of the prediction of a 4*4 luma block by using a prediction mode 3 according to an embodiment of the present invention.

FIG. 4 is a schematic view of the prediction of a 4*4 luma block by using the prediction mode 3 according to an embodiment of the present invention. Referring to FIGS. 3 and 4 together, it can be known from the prediction equation lists in FIG. 3(a) that, in the prediction mode 3, the prediction equation for predicting the prediction value of the pixel (0,0) employs the pixel values of the neighbor pixels A, B, C, and accordingly the prediction value of the pixel (0,0) in FIG. 4 is expressed by f(A, B, C). Similarly, the prediction equation for predicting the prediction value of the pixel (0,1) employs the pixel values of the neighbor pixels B, C, D, and accordingly the prediction value of the pixel (0,1) in FIG. 4 is expressed by f(B, C, D). Accordingly, a general equation is concluded as follows:

$$f(X,Y,Z)=(X+2Y+Z+2)>>2, \text{ and } f(X,Y,Z)=f(Z,Y,X) \quad (1)$$

This equation represents that the prediction value f(X, Y, Z) is obtained by the neighbor pixel X plus 2 times of the neighbor pixel Y plus the neighbor pixel Z and plus 2, and then shifting the result rightwards for 2 bits (i.e., divided by 4), and all the prediction equations of the prediction mode 3 can apply the above general equation (1).

It should be noted that, the prediction equation for predicting the prediction value of pixel (3,3) merely includes the neighbor pixels G and H, and the specific weight of the neighbor pixel H is 3 times larger, so the prediction value of the pixel (3,3) in FIG. 4 is expressed by f(G, H, H), which can be derived as follows:

$$f(G, H, H) = (G + 2H + H + 2) >> 2 \quad (2)$$
$$= (G + 3H + 2) >> 2$$

The prediction equation is the same as that in FIG. 3 (*a*), and it can be known that, when the prediction equation includes the neighbor pixel H, which is located at an end, the prediction equation can be considered to include the adjacent neighbor pixels G, H, H, and the prediction value can be calculated with f(G, H, H).

Figure 5:
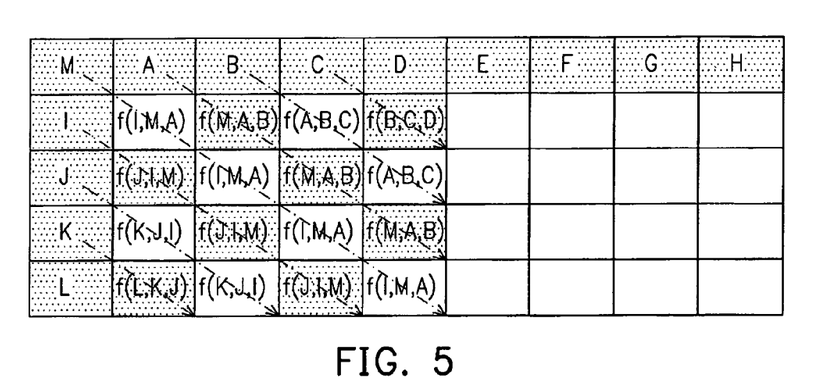
FIG. 5 is a schematic view of the prediction of a 4*4 luma block by using a prediction mode 4 according to an embodiment of the present invention.

FIG. 5 is a schematic view of the prediction of a 4*4 luma block by using the prediction mode 4 according to an embodiment of the present invention. Referring to FIG. 5, the prediction equation of the prediction mode 4 is similar to that of the prediction mode 3, and can be represented by the general equation (1), so the detailed content will not be repeated herein again.

Figure 6:
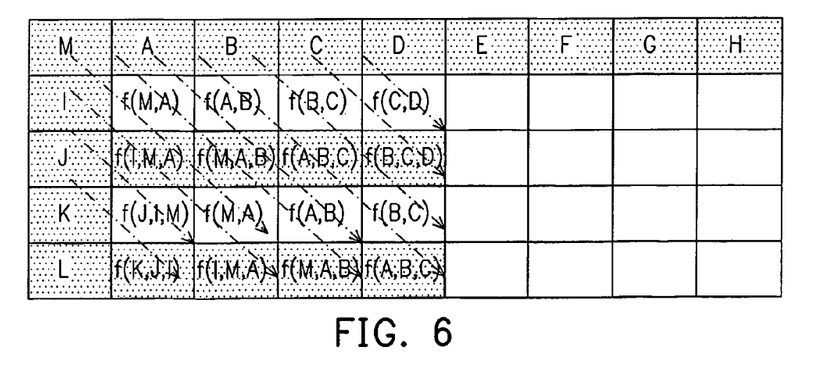
FIG. 6 is a schematic view of the prediction of a 4*4 luma block by using a prediction mode 5 according to an embodiment of the present invention.

FIG. 6 is a schematic view of the prediction of a 4*4 luma block by using the prediction mode 5 according to an embodiment of the present invention. Referring to FIG. 6, the prediction equation including three adjacent neighbor pixels can also be represented by the general equation (1). However, if the prediction equation merely includes two adjacent neighbor pixels, another equation is required. For example, the prediction equation for predicting the prediction value of the pixel (0,0) includes the neighbor pixels M, A, and accordingly, the prediction value of the pixel (0,0) in FIG. 6 is expressed by f(M, A). Similarly, the prediction equation for predicting the prediction value of the pixel (0,1) includes the neighbor pixels A, B, and accordingly, the prediction value of the pixel (0,1) in FIG. 6 is expressed by f(A, B). Accordingly, a general equation is concluded as follows:

$$f(X,Y)=(X+Y+1)>>1, \text{ and } f(X,Y)=f(Y,X) \quad (3)$$

This equation represents that the prediction value f(X, Y) is obtained by the neighbor pixel X plus the neighbor pixel Y and plus 1, and then shifting the result rightwards for 1 bit (i.e., divided by 2).

Figure 7:
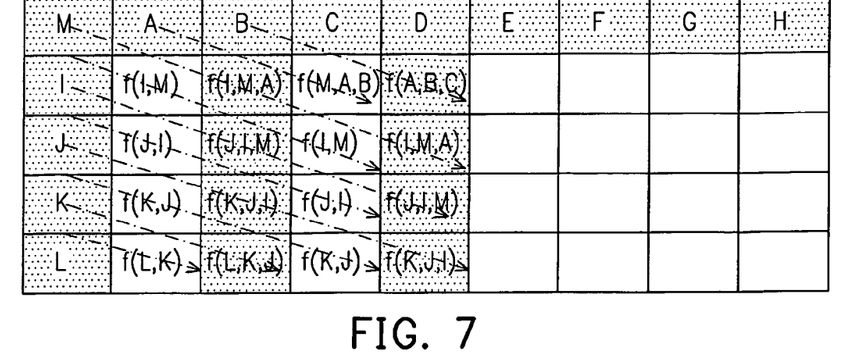
FIG. 7 is a schematic view of the prediction of a 4*4 luma block by using a prediction mode 6 according to an embodiment of the present invention.
Figure 8:
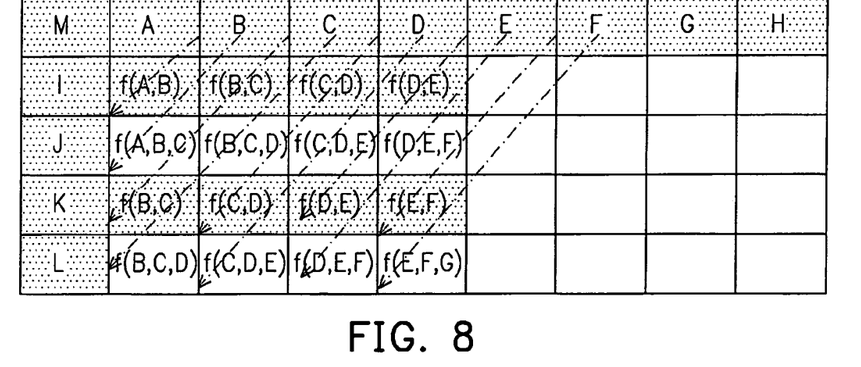
FIG. 8 is a schematic view of the prediction of a 4*4 luma block by using a prediction mode 7 according to an embodiment of the present invention.
Figure 9:
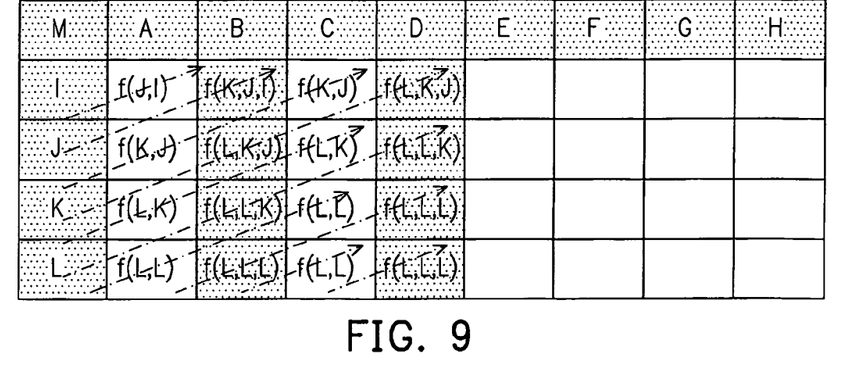
FIG. 9 is a schematic view of the prediction of a 4*4 luma block by using a prediction mode 8 according to an embodiment of the present invention.

FIGS. 7, 8, and 9 are schematic views of the prediction of a 4*4 luma block by using the prediction modes 6, 7, and 8 according to an embodiment of the present invention. Referring to FIGS. 7, 8, and 9, f(L, L, L) or f(L, L) in FIG. 9 represents that the prediction values of the pixels are equal to the neighbor pixel L, and additionally, the prediction equations for the rest pixels can also be represented by the general equations (1), (3), and the detail content will not be repeated herein again.

It should be noted that, the prediction equation for predicting the prediction value of pixel (1,3) and pixel (2, 1) in FIG. 9 merely includes the neighbor pixels L and K, and the specific weight of the neighbor pixel L is 3 times larger, so the prediction value of the pixel (1,3) and pixel (2, 1) in FIG. 9 is expressed by f(L, L, K), which can be derived as follows:

$$f(L, L, K) = (L + 2L + K + 2) >> 2 \quad (3-1)$$
$$= (3L + K + 2) >> 2$$

The prediction equation is the same as that in FIG. 3 (*b*), and it can be known that, when the prediction equation includes the neighbor pixel L, which is located at an end, the prediction equation can be considered to include the adjacent neighbor pixels L, L, K, and the prediction value can be calculated with f(L, L, K).

It can be known from the above analysis, the prediction equation of all the prediction modes can be represented by the general equations (1), (3), and the intermediate value g(X,Y) calculated by the general equation (3) can also be applied to the general equation (1), so as to get three equations in the basic form of the present invention:

$$g(X,Y)=X+Y+1, \quad (4)$$

$$f(X,Y,Z)=[g(X,Y)+g(Y,Z)]>>2, \quad (5)$$

$$f(X,Y)=g(X,Y)>>1. \quad (6)$$

It can be known from the relationship between the equations in the basic form that, as long as the intermediate value g(X,Y) is obtained by calculating a sum of every two adjacent neighbor pixels X, Y surrounding the luma block plus 1 by using the equation (4) in advance, the rest operations are merely to add two adjacent intermediate values and shift the sum rightwards for 2 bits (as shown in the equation (5)) and shift the g(X,Y) rightwards for 1 bit (as shown in the equation (6)), so as to obtain the desired prediction values f(X,Y, Z) and f(X,Y), respectively.

It can be known from the above that, according to the present invention, the method of calculating the intermediate value in advance and applying the intermediate value into the prediction equations may not only save the time and cost of repeating the operation, but also reduce the number of condition check executed during the operation, thus achieving accelerating the coding speed. In order to make the concept clearer, another embodiment is illustrated in detail hereinafter.

Figure 10:
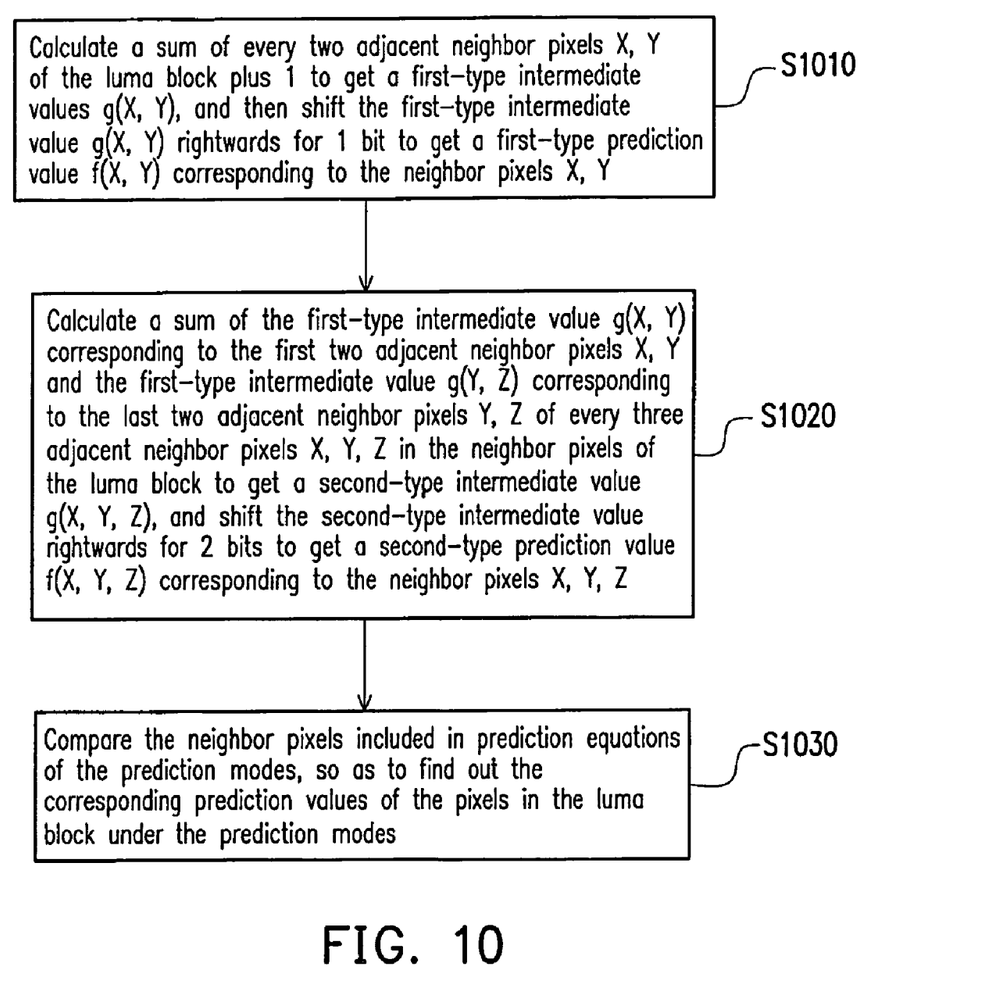
FIG. 10 is a flow chart of an intra prediction method for a luma block of a video according to an embodiment of the present invention.

FIG. 10 is a flow chart of an intra prediction method for a luma block of a video according to an embodiment of the present invention. Referring FIG. 10, this embodiment is applicable to the calculation of prediction values of the pixels in the luma block of a video image under various prediction modes. The prediction modes are nine modes (i.e., prediction modes 0-8) included in the H.264 video standard. The luma block is, for example, but not limited to, a 4*4 block, and those skilled in the art can apply the method of the present invention in the prediction of blocks of other sizes and types, such as a 8*8 chroma block or 16*16 luma block, according to actual requirements.

First, a sum of every two adjacent neighbor pixels X, Y of the luma block plus 1 is calculated to get a first-type intermediate values g(X, Y). Next, the first-type intermediate value g(X, Y) is shifted rightwards for 1 bit to get a first-type prediction value f(X,Y) corresponding to the adjacent neighbor pixels X, Y (Step S1010). The first-type intermediate value g(X, Y)=X+Y+1, and the first-type prediction value f(X, Y)=g(X, Y)>>1, X, Y are integers.

Then, a sum of the first-type intermediate value g(X, Y) corresponding to the first two adjacent neighbor pixels X,Y of every three adjacent neighbor pixels X, Y, Z in the neighbor pixels of the luma block and the first-type intermediate value g(Y, Z) corresponding to the last two adjacent neighbor pixels Y, Z is calculated, so as to get a second-type intermediate value g(X, Y, Z), and the second-type intermediate value is shifted rightwards for 2 bits, so as to get a second-type prediction value f(X, Y, Z) corresponding to the adjacent neighbor pixels X, Y, Z (Step S1020). The second-type intermediate value g(X, Y, Z)=g(X, Y)+g(Y, Z), and the second-type prediction value f(X, Y, Z)=g(X, Y, Z)>>2.

Afterwards, the neighbor pixels included in the prediction equations of the prediction modes are compared, so as to find out the corresponding prediction values of the pixels in the luma block under the prediction modes (Step S1030). In this step, when the prediction equation includes the adjacent neighbor pixels X, Y, the first-type prediction value f(X, Y) corresponding to the adjacent neighbor pixels X, Y is used as the prediction value of the pixel, and when the prediction equation includes the adjacent neighbor pixels X, Y, Z, the second-type prediction value f(X, Y, Z) corresponding to the adjacent neighbor pixels X, Y, Z is used as the prediction value of the pixel.

It should be noted that, as for the neighbor pixel that is located at an end (for example, the neighbor pixel L or H in FIG. 1), this embodiment also includes accumulating the neighbor pixel at the end and plus 1 in advance to get a first-type intermediate value f(Y, Y)=2*Y+1 of the neighbor pixel Y, next calculating a sum of the first-type intermediate value g(X, Y) corresponding to the adjacent neighbor pixels X, Y at the end and the first-type intermediate value g(Y, Y) corresponding to the neighbor pixel Y in Step S1020 to get a second-type intermediate value g(X, Y, Y)=g(X, Y)+g(Y, Y), and then shifting the second-type intermediate value g(X, Y, Y) rightwards for 2 bits to get a second-type prediction value f(X, Y, Y) corresponding to the adjacent neighbor pixels X, Y at the end. The second-type intermediate value g(X, Y, Y)=g(X, Y)+g(Y, Y), and the second-type prediction value f(X, Y, Y)=g(X, Y, Y)>>2. Finally, in Step S1030, when the prediction equation includes the adjacent neighbor pixels X, Y at the end and the specific weight of the neighbor pixel Y is 3 times larger, the second-type prediction value f(X, Y, Y) corresponding to the adjacent neighbor pixels X, Y is used as the second-type prediction value of the pixel. When the prediction equation includes the adjacent neighbor pixels X, Y at the end and the specific weight of the neighbor pixel X is 3 times larger, the second-type prediction value f(X, X, Y) corresponding to the adjacent neighbor pixels X, Y is used as the second-type prediction value of the pixel The above method may simplify the operation of the prediction equation of the prediction modes 3-8, thereby reducing the time required for calculating the prediction value of each prediction mode. At this time, if the prediction values of the prediction modes 3-8 are compared with the prediction values of the prediction modes 0-2, an optimal prediction mode can be selected and applied in the subsequent video coding, thus achieving the effect of accelerating the coding speed, which is illustrated in detail below with reference to an embodiment.

Figure 11:
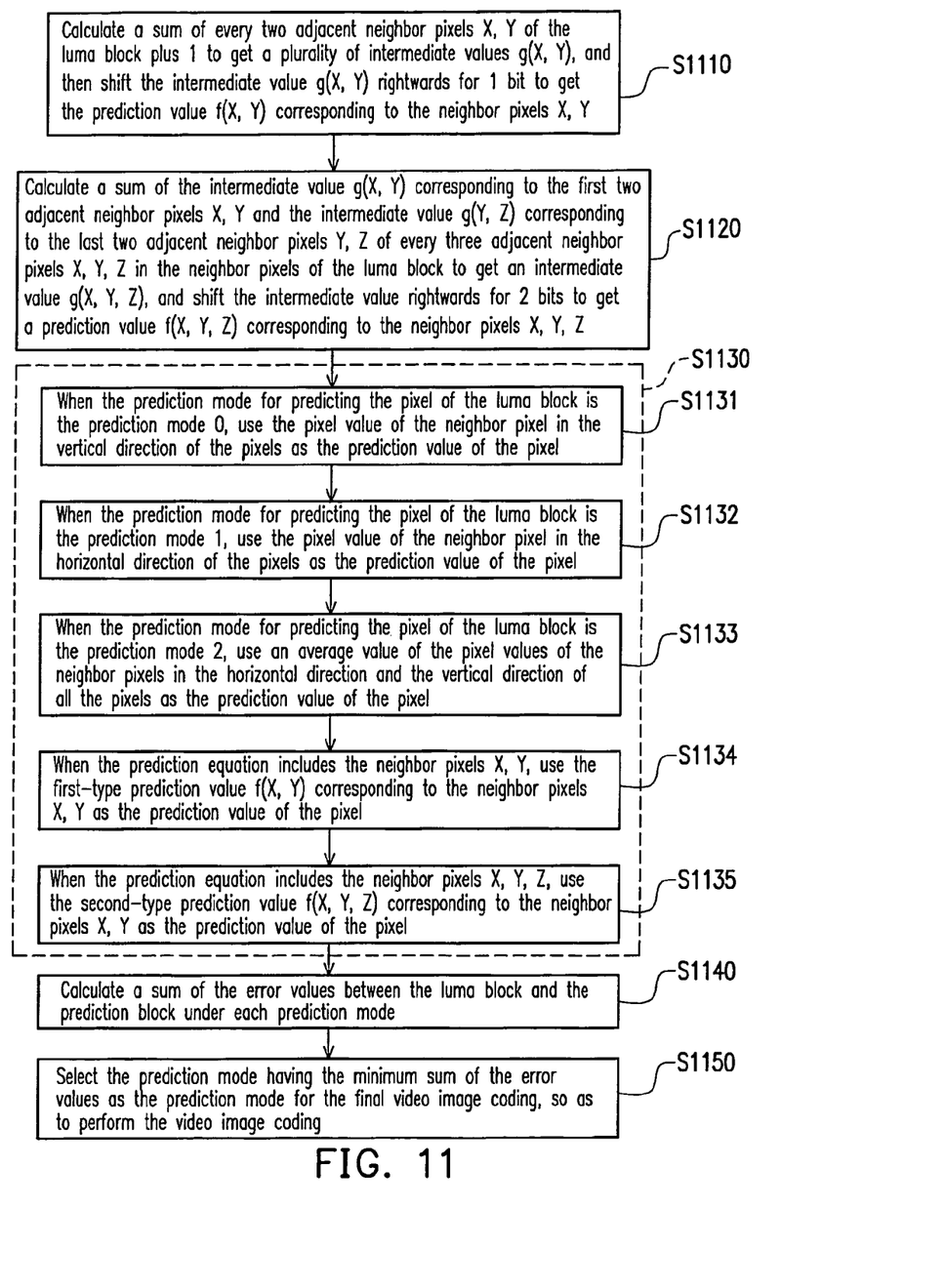
FIG. 11 is a flow chart of an intra prediction method for a luma block of a video according to another embodiment of the present invention.

FIG. 11 is a flow chart of an intra prediction method for a luma block of a video according to another embodiment of the present invention. Referring to FIG. 11, in this embodiment, the prediction values of the luma block under the prediction modes 3-8 calculated in the previous embodiment are compared with the prediction values under the prediction modes 0-2, so as to select an optimal prediction mode to code the luma block of the video image.

First, a sum of every two adjacent neighbor pixels X, Y of the luma block plus 1 is calculated to get a first-type intermediate values g(X, Y). Next, the first-type intermediate value g(X, Y) is shifted rightwards for 1 bit, so as to get the first-type prediction value f(X, Y) corresponding to the adjacent neighbor pixels X, Y (Step S1110). The first-type intermediate value g(X, Y)=X+Y+1, the first-type prediction value f(X, Y)=g(X, Y)>>1, and X, Y are integers.

Then, a sum of the first-type intermediate value g(X, Y) corresponding to the first two adjacent neighbor pixels X, Y of every three adjacent neighbor pixels X, Y, Z in the neighbor pixels of the luma block and the first-type intermediate value g(Y, Z) corresponding to the last two adjacent neighbor pixels Y, Z is calculated, to get a second-type intermediate value g(X, Y, Z), and the second-type intermediate value is shifted rightwards for 2 bits, to get a second-type prediction value f(X, Y, Z) corresponding to the adjacent neighbor pixels X, Y, Z (Step S1120). The second-type intermediate value g(X, Y, Z)=g(X, Y)+g(Y, Z), and the second-type prediction value f(X, Y, Z)=g(X, Y, Z)>>2.

Afterwards, the neighbor pixels included in the prediction equations of the prediction modes are compared, so as to find out the corresponding prediction values of the pixels in the luma block under the prediction modes (Step S1130). According to the different prediction equations adopted by the prediction mode, this step can be further divided into a plurality of sub-steps, which are respectively described as follows.

In Step S1131, when the prediction mode for predicting the pixel of the luma block is the prediction mode 0, the pixel value of the neighbor pixel in the vertical direction of the pixels is used as the prediction value of the pixel.

In Step S1132, when the prediction mode for predicting the pixel of the luma block is the prediction mode 1, the pixel value of the neighbor pixel in the horizontal direction of the pixels is used as the prediction value of the pixel.

In Step S1133, when the prediction mode for predicting the pixel of the luma block is the prediction mode 2, an average value of the pixel values of the neighbor pixels in the horizontal direction and the vertical direction of all the pixels is used as the prediction value of the pixel.

In Step S1134, when the prediction mode for predicting the pixel of luma block is one of the prediction modes 3~8, the prediction equation includes the neighbor pixels X, Y, the first-type prediction value f(X, Y) corresponding to the adjacent neighbor pixels X, Y is used as the prediction value of the pixel.

In Step S1135, when the prediction mode for predicting the pixel of luma block is one of the prediction modes 3~8, the prediction equation includes the adjacent neighbor pixels X, Y, Z, the second-type prediction value f(X, Y, Z) corresponding to the adjacent neighbor pixels X, Y, Z is used as the prediction value of the pixel.

Through the comparison and calculation of Step S1130, the prediction values of the pixels in the luma block under each prediction mode can be obtained and used as the prediction block of the luma block under each prediction mode. The next step is to calculate a sum of the error value between the luma block and the prediction block under each prediction mode (Step S1140).

Finally, the prediction mode having the minimum sum of the error value is selected as the prediction mode for the final video image coding, so as to perform the video image coding (Step S1150). It can be known from the above that, in this embodiment, the prediction values corresponding to the common items in all the prediction equations are calculated in advance. When calculating the prediction value with the prediction equation in practice, only the neighbor pixels included in the prediction equations are required to be compared simply, and the prediction values corresponding to the neighbor pixels are selected for use, such that the calculation results of each prediction equation can be fast obtained.

Figure 12:
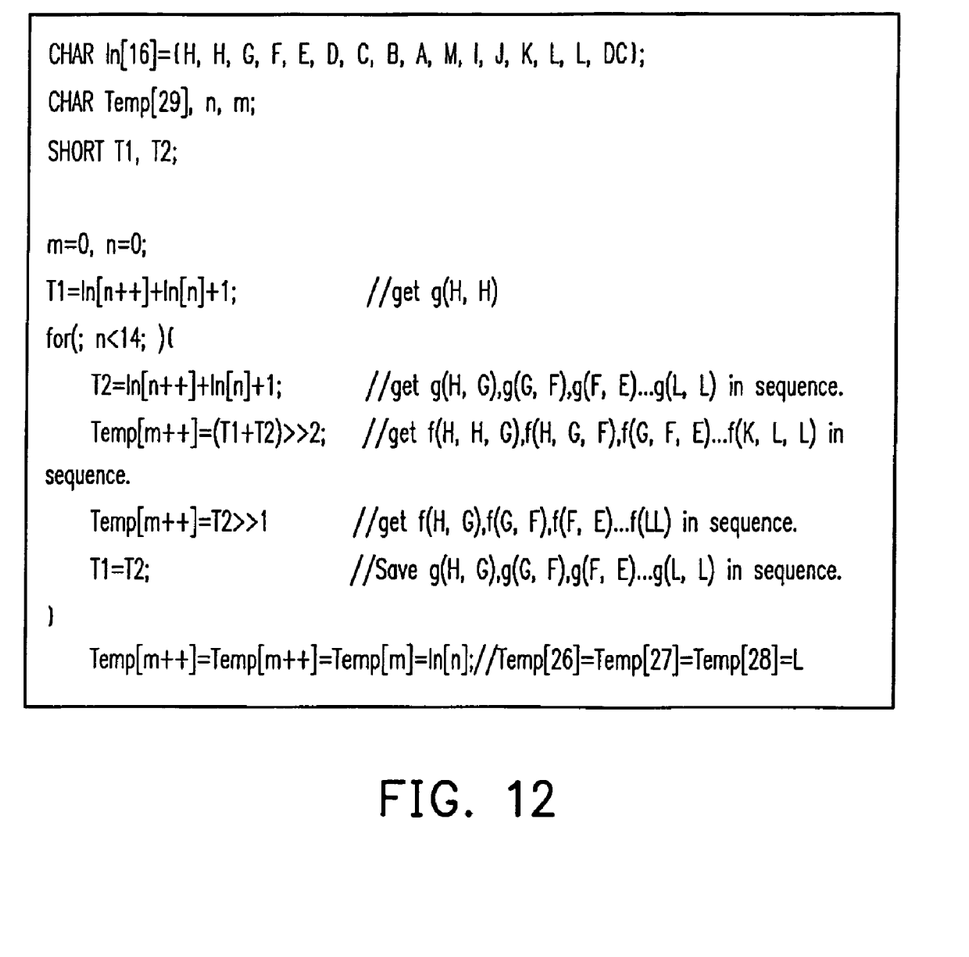
FIG. 12 shows a pseudo code of calculation values and prediction values according to an embodiment of the present invention.
Figure 13:
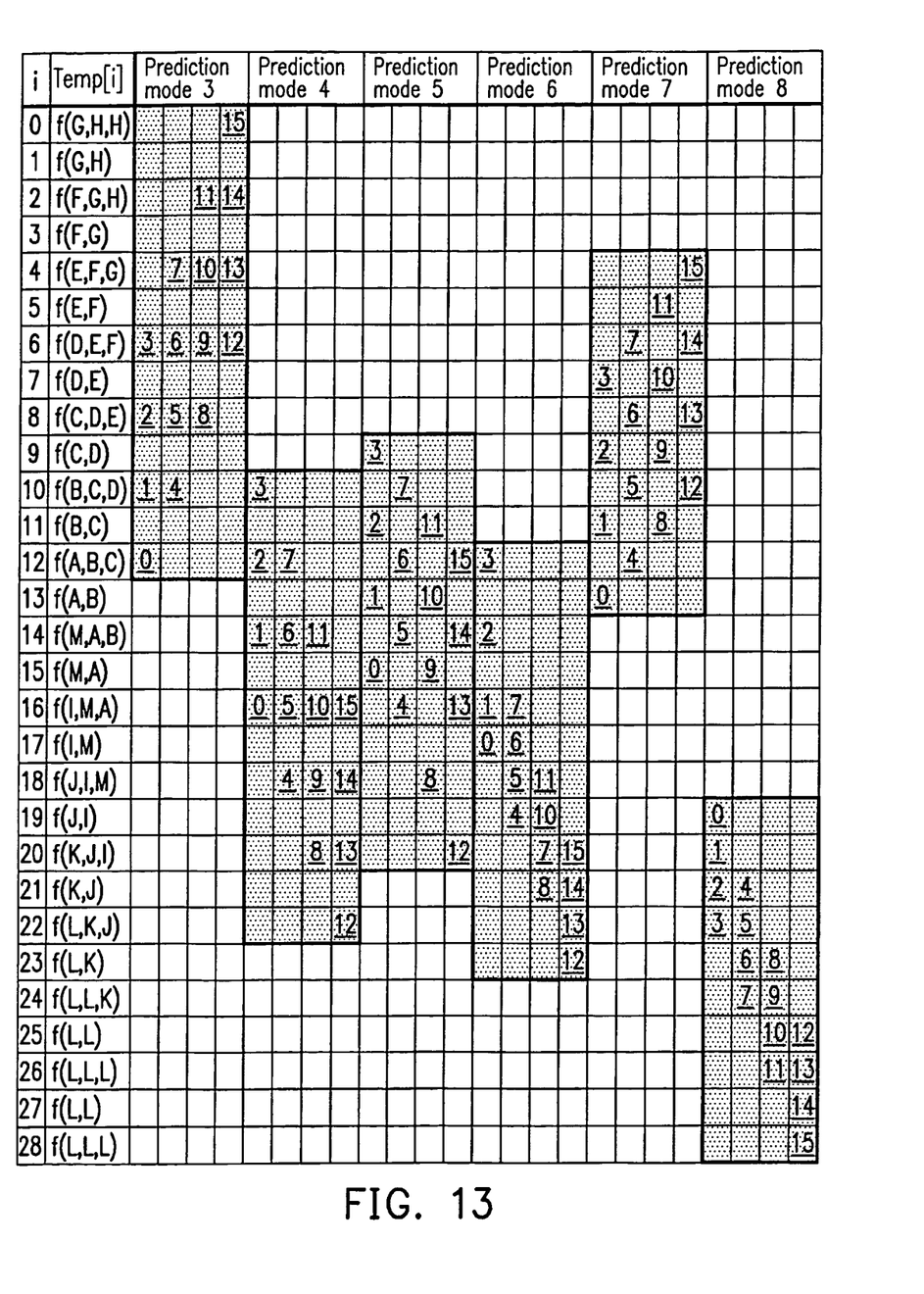
FIG. 13 is a conversion table of pixels and prediction values calculated in advance under prediction modes 3~8 according to an embodiment of the present invention.
Figure 14:
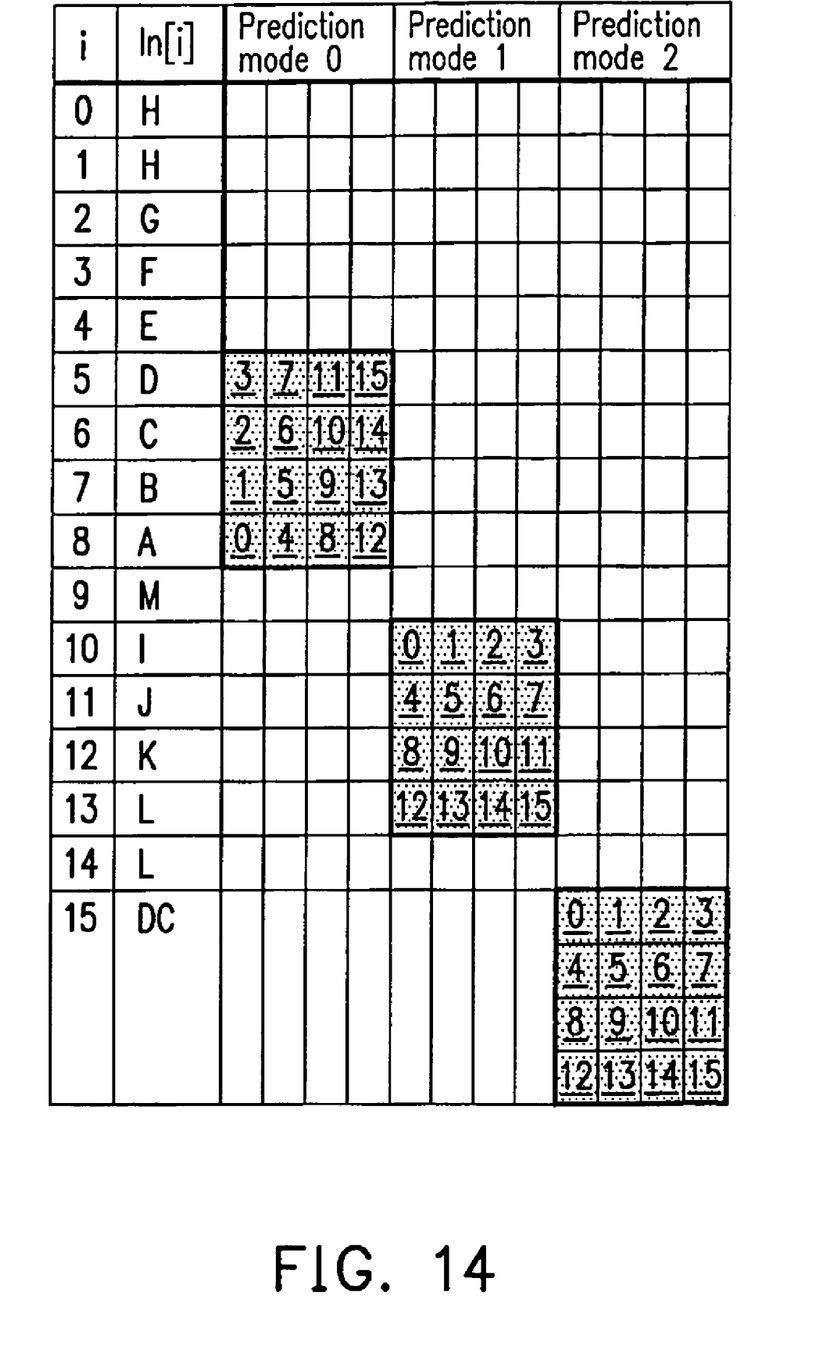
FIG. 14 is a conversion table of pixels and prediction values stored or calculated in advance under prediction modes 0~2 according to an embodiment of the present invention.

Moreover, in the implementation of the method, the present invention further includes designing a corresponding pseudo code to execute the operation of calculating the intermediate value and the prediction value in advance. Referring to FIG. 12, the pseudo code uses the three basic form equations of the present invention to perform operation mainly for the items used by each prediction equation of the prediction modes 3-8, and the operation results are as follows:

Temp[ ]={
f(H, H, G), f(H, G), f(H, G, F), f(G, F),
f(G, F, E), f(F, E), f(F, E, D), f(E, D),
f(E, D, C), f(D, C), f(D, C, B), f(C, B),
f(C, B, A), f(B, A), f(B, A, M), f(A, M),
f(A, M, I), f(M, I), f(M, I, J), f(I, J),
f(I, J, K), f(J, K), f(J, K, L), f(K, L),
f(K, L, L), f(L, L), f(L, L, L), f(L, L, L),
f(L, L, L)
} in which, f(L, L)=f(L, L, L)=L. The data in In[ ], as shown in FIG. 12, are stored in a special order as shown in FIG. 12, are considered as the prediction values for prediction modes 0~2, and are used to compute the prediction values, which are saved in Temp[ ] for prediction modes 3~8. The In[ ] contains the neighbor pixels, A~M, and the DC, which is the average of A~M and is computed during storing A~M. The operation results Temp[ ] include the prediction values f(X, Y) and f(X,Y,Z) corresponding to the items included in the prediction equations, and after obtaining the prediction values calculated in advance, it gets relatively easy to query the prediction values of specific pixels under specific prediction mode since all the prediction values can be obtained by accessing a simple pattern. FIG. 13 is a conversion table of pixels of the luma block and the neighbor pixels included in the prediction equation under prediction modes 3~8 according to an embodiment of the present invention and FIG. 14 is a conversion table of pixels of the luma block and the neighbor pixels included in the prediction equation under prediction modes 0~2 according to an embodiment of the present invention. Referring to FIG. 13 and FIG. 14, index i represents the items of the Temp[ ] and In[ ] and includes the items existing in all the prediction equations. Further, the numbers 0~15 marked with underlines in the table represent pixels (0,0), (0,1), (0,2), (0,3), . . . , (3,0), (3,1), (3,2), (3,3) in sequence in the luma block.

The prediction values of the pixels can be obtained by looking up the conversion table for the adjacent neighbor pixels corresponding to the pixels, and accessing the prediction values corresponding to the adjacent neighbor pixels. The method of looking up the conversion table includes looking up the conversion table for a field corresponding to the prediction mode first according to the executed prediction mode, and then finding out the neighbor pixels corresponding to the pixels in sequence according to start positions, sequences, and intervals of the pixels in the field of the conversion table.

Taking the prediction mode 8 as an example, first, a conversion table (i.e., FIG. 13) is looked up for a field corresponding to the prediction mode, and next for the starting positions of the pixels (i.e., the position of the pixel (0,0)). The item corresponding to the pixel (0,0) is the $19^{th}$ item (including neighbor pixels J and I) by looking up the conversion table for the field of the prediction mode 8, and at this time, as long as the prediction values of the neighbor pixels J and I calculated in advance are accessed, the prediction value of the pixel (0,0), i.e., f(J, I) can be obtained. Afterwards, according to the sequences and intervals of other pixels in the conversion table, the neighbor pixels corresponding to each pixel are found out in sequence. The items corresponding to the pixels (0,1), (0,2), (0,3) are the $20^{th}$, $21^{st}$, $22^{nd}$ items by looking up the conversion table, and at this time, as long as the prediction values of the neighbor pixels corresponding to the items are accessed, the prediction values of the pixels (0,1), (0,2), (0,3) can be obtained. It should be noted that, as seen from the conversion table, the item corresponding to the pixel (1,0) of the next column in the luma block is shifted downward from the $19^{th}$ item for two items, and at this time, the prediction value of the $21^{st}$ item (including the neighbor pixels K and J) is required to be accessed, so as to get the prediction value of the pixel (1,0), i.e., f(K, J). Afterwards, according to the sequences and intervals of other pixels in the conversion table, the neighbor pixels corresponding to each pixel are found out in sequence. The items corresponding to the pixels (1,1), (1,2), (1,3) are the $22^{nd}$, $23^{rd}$, $24^{th}$ items by looking up the conversion table, and at this time, as long as the prediction values of the neighbor pixels corresponding to the items are accessed, the prediction values of the pixels (1,1), (1,2), (1,3) can be obtained. By using the same pattern mentioned above, the prediction values of pixels (2, 0), (2, 1), (2, 2), (2, 3), (3, 0), (3,1), (3, 2), and (3, 3) can be obtained. Accordingly, the calculation for the prediction value of any pixel under any prediction mode can be completed by simple comparison and access, such that the time and cost for performing the intra prediction on the luma block of the video can be reduced, thereby accelerating the video coding speed.

Moreover, taking the prediction mode 0 as an example, first, a conversion table (i.e., FIG. 14) is looked up for a field corresponding to the prediction mode, and next for the starting positions of the pixels (i.e., the position of the pixel (0,0)). The item corresponding to the pixel (0,0) is the $8^{th}$ item (neighbor pixel A) by looking up the conversion table for the field of the prediction mode 0, and at this time, as long as the prediction value of the neighbor pixel A is accessed, the prediction value of the pixel (0,0), can be obtained. Afterwards, according to the sequences and intervals of other pixels in the conversion table, the neighbor pixels corresponding to each pixel are found out in sequence. The items corresponding to the pixels (0,1), (0,2), (0,3) are the $7^{th}$, $6^{th}$, $5^{th}$ items by looking up the conversion table, and at this time, as long as the prediction values of the neighbor pixels corresponding to the items are accessed, the prediction values of the pixels (0,1), (0,2), (0,3) can be obtained. It should be noted that, as seen from the conversion table, the item corresponding to the pixel (1,0) of the next column in the luma block is same as that for pixel (0, 0), and at this time, the neighbor pixel of the 8th item, A, is required to be accessed, so as to get the prediction value of the pixel (1,0). Afterwards, according to the sequences and intervals of other pixels in the conversion table, the neighbor pixels corresponding to each pixel are found out in sequence. The items corresponding to the pixels (1,1), (1,2), (1,3) are the $7^{th}$, $6^{th}$, $5^{th}$ items by looking up the conversion table, and at this time, as long as the prediction values of the neighbor pixels corresponding to the items are accessed, the prediction values of the pixels (1,1), (1,2), (1,3) can be obtained. By using the same pattern mentioned above, the prediction values of pixels (2, 0), (2, 1), (2, 2), (2, 3), (3, 0), (3, 1), (3, 2), and (3, 3) can be obtained. Accordingly, the calculation for the prediction value of any pixel under any prediction mode can be completed by simple comparison and access, such that the time and cost for performing the intra prediction on the luma block of the video can be reduced, thereby accelerating the video coding speed.

Accordingly, the prediction value computation for 4×4 intra prediction modes 3~8 and the prediction value access for 4×4 intra prediction modes 0~8 can share a common software (SW) function or hardware (HW) circuit. Therefore, it can fast up the intra prediction speed and reduce the SW/HW cost.

As shown in FIG. 13 and FIG. 14, except for a very few exceptions, the item captured from Temp[ ] and In[ ] for the prediction pixel required by each specific prediction mode corresponds to an index (i), and the variation of the index are regular, which is very beneficial for the aforesaid nine prediction modes to share a common software function or hardware circuit to get the desired prediction pixels.

In view of the above, the intra prediction method for a luma block of a video of the present invention at least has the following advantages:

1. The standard of H.264 defines nineteen prediction equations for calculating the prediction value of a 4*4 luma block under the prediction modes 3-8, and the present invention simplifies the prediction equations into three basic-form equations (i.e., equations 4, 5, and 6).

2. The equations adopted by the conventional art for predicting each prediction pixel of the prediction modes 3-8 have great variation, and the sampling points are different since the prediction equations are different for different prediction modes (as shown in FIGS. 3(a) and 3(b)). Accordingly, when being applied in software or hardware, different modes require a functions or circuits respectively. The present invention provides a solution for unifying the prediction modes, and as long as a few function parameters or register settings are modified, the prediction modes may share the whole function or circuit.

3. The present invention calculates the prediction values of the common items in all the prediction equations in advance, and directly selects the prediction values when predicting the luma block in practice, thus avoiding the repeated operation of the same items.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An intra prediction method for a luma block of a video for use in video image coding, comprising:
calculating a sum of every two adjacent neighbor pixels X, Y in a plurality of neighbor pixels of the luma block plus 1, so as to get a first-type intermediate value, and then shifting the first-type intermediate value rightwards for 1 bit to get a first-type prediction value corresponding to the adjacent neighbor pixels X, Y;
calculating a sum of the first-type intermediate value corresponding to the first two adjacent neighbor pixels X, Y and the first-type intermediate value corresponding to the last two adjacent neighbor pixels Y, Z of every three adjacent neighbor pixels X, Y, and Z in the plurality of neighbor pixels of the luma block, so as to get a second-type intermediate value, and then shifting the second-type intermediate value rightwards for 2 bits to get a second-type prediction value corresponding to the adjacent neighbor pixels X, Y, Z, wherein X, Y, Z are integers; and
comparing the neighbor pixels contained in a plurality of prediction equations of the prediction modes, so as to find out the first-type prediction value or the second-type prediction value corresponding to the pixels in the luma block under the prediction modes respectively.

2. The intra prediction method for a luma block of a video according to claim 1, wherein the step of comparing the neighbor pixels contained in a plurality of prediction equations of the prediction modes, so as to find out the first-type prediction value or the second-type prediction value corresponding to the pixels in the luma block under the prediction modes respectively comprises:

when the prediction equation comprises the adjacent neighbor pixels X, Y, using the first-type prediction value f(X, Y) corresponding to the adjacent neighbor pixels X, Y as the first-type prediction value of the pixel; and when the prediction equation comprises the adjacent neighbor pixels X, Y, Z, using the second-type prediction value f(X, Y, Z) corresponding to the adjacent neighbor pixels X, Y, Z as the second-type prediction value of the pixel.

3. The intra prediction method for a luma block of a video according to claim 1, wherein the step of calculating the first-type intermediate value and the first-type prediction value of every two adjacent neighbor pixels X, Y in the neighbor pixels of the luma block further comprises:
calculating an accumulation of a neighbor pixel Y at an end in the neighbor pixels of the luma block plus 1, so as to get the first-type intermediate value of the neighbor pixel Y, and then shifting the first-type intermediate value rightwards for 1 bit to get the first-type prediction value corresponding to the neighbor pixel Y at the end.

4. The intra prediction method for a luma block of a video according to claim 3, wherein the step of calculating the second-type intermediate value and the second-type prediction value of the luma block further comprises:
calculating a sum of the first-type intermediate value corresponding to the adjacent neighbor pixels X, Y at the end and the first-type intermediate value corresponding to the neighbor pixel Y, so as to get the second-type intermediate value, and then shifting the second-type intermediate value rightwards for 2 bits to get the second-type prediction value corresponding to the adjacent neighbor pixels X, Y at the end.

5. The intra prediction method for a luma block of a video according to claim 4, wherein the step of finding out the first-type prediction value or the second-type prediction value corresponding to the pixels in the luma block under the prediction modes further comprises:
when the prediction equation comprises the adjacent neighbor pixels X, Y and a specific weight of the neighbor pixel Y is 3 times larger, using the second-type prediction value corresponding to the adjacent neighbor pixels X, Y as the prediction value of the pixel.

6. The intra prediction method for a luma block of a video according to claim 3, wherein the step of calculating the second-type intermediate value and the second-type prediction value of the luma block further comprises:
calculating a sum of the first-type intermediate value corresponding to the adjacent neighbor pixels X, Y at the end and the first-type intermediate value corresponding to the neighbor pixel X, so as to get the second-type intermediate value, and then shifting the second-type intermediate value rightwards for 2 bits to get the second-type prediction value corresponding to the adjacent neighbor pixels X, Y at the end.

7. The intra prediction method for a luma block of a video according to claim 6, wherein the step of finding out the first-type prediction value or the second-type prediction value corresponding to the pixels in the luma block under the prediction modes further comprises:
when the prediction equation comprises the adjacent neighbor pixels X, Y and a specific weight of the neighbor pixel X is 3 times larger, using the second-type prediction value corresponding to the adjacent neighbor pixels X, Y as the prediction value of the pixel.

8. The intra prediction method for a luma block of a video according to claim 1, wherein the step of comparing the neighbor pixels contained in the prediction equations of the prediction modes, so as to find out the first-type prediction value or the second-type prediction value corresponding to the pixels in the luma block under the prediction modes further comprises:

looking up a conversion table to find out the neighbor pixels corresponding to the pixel, wherein the conversion table records the pixels in the luma block and the corresponding neighbor pixels contained in the prediction equations of the prediction modes; and accessing the first-type prediction value or the second-type prediction value corresponding to the neighbor pixels.

9. The intra prediction method for a luma block of a video according to claim 8, wherein the step of looking up a conversion table to find out the neighbor pixels corresponding to the pixels comprises:

looking up the conversion table for a field corresponding to the prediction mode according to the executed prediction mode; and finding out the neighbor pixels corresponding to the pixels in sequence according to start positions, sequences, and intervals of the pixels in the field of the conversion table.

10. The intra prediction method for a luma block of a video according to claim 1, wherein the step of comparing the neighbor pixels contained in the prediction equations of the prediction modes, so as to find out the first-type prediction value or the second-type prediction value corresponding to the pixels in the luma block under the prediction modes further comprises:

when the prediction mode of the pixel in the luma block is a vertical prediction mode, using a pixel value of the neighbor pixel in a vertical direction of the pixel as the prediction value of the pixel.

11. The intra prediction method for a luma block of a video according to claim 1, wherein the step of comparing the neighbor pixels contained in the prediction equations of the prediction modes, so as to find out the first-type prediction value or the second-type prediction value corresponding to the pixels in the luma block under the prediction modes further comprises:

when the prediction mode of the pixel of the luma block is a horizontal prediction mode, using a pixel value of the neighbor pixel in a horizontal direction of the pixel as the prediction value of the pixel.

12. The intra prediction method for a luma block of a video according to claim 1, wherein the step of comparing the neighbor pixels contained in the prediction equations of the prediction modes, so as to find out the first-type prediction value or the second-type prediction value corresponding to the pixels in the luma block under the prediction modes further comprises:

when the prediction mode of the pixel of the luma block is a DC prediction mode, using an average of the pixel values of the neighbor pixels in the horizontal direction and the vertical direction of all the pixels in the luma block as the prediction value of the pixel.

13. The intra prediction method for a luma block of a video according to claim 1, after the step of comparing the neighbor pixels contained in the prediction equations of the prediction modes, so as to find out the first-type prediction value or the second-type prediction value corresponding to the pixels in the luma block under the prediction modes further comprising:

calculating a sum of an error value of the pixel value and the first-type prediction value or the second-type prediction value of the pixels in the luma block; and selecting the prediction mode with a minimum sum of the error value to encode the video image.

14. The intra prediction method for a luma block of a video according to claim 1, wherein the luma block is a 4*4 block.

15. The intra prediction method for a luma block of a video according to claim 1, wherein the prediction modes are nine prediction modes contained in H.264 video standard.

16. The intra prediction method for a luma block of a video according to claim 1, wherein the prediction modes comprise vertical prediction mode, horizontal prediction mode, DC prediction mode, diagonal down-left prediction mode, diagonal down-right prediction mode, vertical right prediction mode, horizontal down prediction mode, vertical left prediction mode, and horizontal up prediction mode.

* * * * *